Patented Mar. 7, 1939

2,149,857

UNITED STATES PATENT OFFICE 2,149,857

OILINESS AGENT IN LUBRICATING OILS

Louis A. Mikeska, Westfield, and Raphael Rosen, Elizabeth, N. J., assignors to Standard Oil Development Company, a corporation of Delaware No Drawing. Application July 18, 1936, Serial No. 91,424

7 Claims. (Cl. 87—9)

The present invention relates to improved lubricating oil and more specifically to oils of increased oiliness. The composition and the method of manufacturing it will be fully understood from the following description:

Hydrocarbon lubricating oils are known to be somewhat deficient in oiliness. For most purposes they are, of course, adequate but in certain instances it is desirable to increase this property, for example in the use of oils of increased load bearing capacity and in any instance, in fact, where extreme conditions are encountered. The present inventors have found that this result can be accomplished by the use of relatively small amounts of certain acid compounds, which term is used to include the esters of these acids as well. The particular addition agents can be readily prepared from materials available to petroleum refiners and they largely represent waste products at the present time.

It should further be recognized that all acid or ester materials are not satisfactory for this purpose, some cause excessive corrosion or oxidize rapidly to form gum or other objectionable materials which lead to sludging or emulsification.

The present invention consists in the use of acid compounds produced by the reaction of diolefins, in particular the so-called conjugated diolefins which are characterized by the presence of a single carbon to carbon valence between the two carbon atoms to which the double bonds are attached, thus

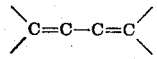

The particular diolefins used are those containing more than four carbon atoms, preferably containing from 5 to 8 carbon atoms. Aliphatic diolefins of this particular type occur in cracked naphthas and in relatively large amounts in vapor phase cracked naphthas where the cracking temperature is of the order of 950 to 1150° F. or thereabout. These materials are not desirable constituents of the naphthas because of the fact that they readily resinify and therefore it is desirable to remove them from the naphtha before it can be used for motor fuels.

Certain terpene cuts for example obtained from turpentine are very rich in diolefins and these may be used as a source of such materials instead of the cracked hydrocarbon fractions referred to above.

One means for the removal of these materials is the use of maleic anhydride and in this treatment a condensation product of the said diolefins occurs with the maleic anhydride to produce the particular acids which are found to be useful for the present purposes. The reaction is accomplished by adding maleic anhydride to the naphtha in liquid phase and maintaining the contact for a prolonged period at a temperature range from about 0° C. to 100° C. At the low temperatures relatively longer time is required than at the high temperatures. The reaction is not very rapid at the lower range of the temperatures indicated while at the higher temperatures a polymerization of the diolefins is likely to occur to some extent. Therefore, it is preferable to use a suitable temperature between these limits so as to effect the reaction in a reasonable time without substantial polymerization. The condensation product may be separated from the naphtha by filtration, centrifugation or sedimentation and then may be purified in any desirable manner.

The product is the result of the condensation of the conjugated diolefins with maleic anhydride. The addition of water converts the anhydride into an acid. Esterification may be accomplished in any of the usual ways, for example by refluxing with the particular alcohol whose ester is desired, in presence of a suitable catalyst such as sulfuric acid preferably using benzene or other diluents. While single diolefins may be used, a mixture of those diolefins such as are obtained from vapor phase cracked naphtha is particularly desirable. Cyclic diolefins may, of course, be used for example as obtained from turpentine, for example the pentadienes or hexadienes such as 1,3 cyclo pentadiene and 1,3 hexadiene, although these are to be taken as mere examples. These materials are more reactive than the open chain diolefins and usually it is preferable to conduct the condensation at a lower temperature.

If desired, the diolefins may be separated from the naphtha in which they occur by any desired means such as close fractionation or absorption in suitable solvents or reagents which form compounds that can be subsequently decomposed such as cuprous chloride. The recovered diolefins may then be caused to react with the maleic anhydride, or as indicated above the reaction with maleic anhydride may be employed for the dual purpose of removing diolefins from the naphtha and at the same time producing the addition agent.

While maleic anhydride is the preferred agent for the purpose unsaturated aldehydes can also be used. The condensation in this case is an aldehyde which can be readily oxidized to the acid by direct air oxidation under known conditions and then esterified as before. As a specific example of this reaction may be mentioned the reaction of a diolefin with crotonaldehyde. The thio aldehydes can be used in place of the ordinary aldehydes.

While the acids may be used as addition agents to lubricants, it is usually preferable to employ the esters which are not corrosive. In producing the esters, any alcohols may be employed for example the common low molecular weight alcohols such as methyl, ethyl, the propyl and butyl alcohols, but higher alcohols even wax alcohols such as lauryl acetyl can be used if desired as well as the cyclic alcohols, for example phenyl, furfuryl, benzyl, cresyl and naphthyl. Mono hydric alcohols are preferred but glycols and glycerine may be used. Thio alcohols, mercaptans, may be used in place of the ordinary oxygen alcohols to produce thio acids and esters.

The addition agents may be added to lubricating oils of any type but particularly those which are to be used under extreme conditions; for example, they may be used in oils for automobiles or airplane engines. They also may be employed in the manufacture of greases. The esters may be used as such or the alkali or alkaline metal salts of the acids can be used in the grease. As little as 1/10% by weight of these materials will produce a marked effect, but it is preferable to use somewhat more in most cases, for example from about 1 to 5%.

The following examples may be considered illustrative of the present compositions and illustrate their method of manufacture:

1. A hydrocarbon lubricating oil, S. A. E. 20, is used as a base stock in the following tests. The unblended oil was sample 1. Sample 2 is the same oil to which is added 2% of an n-butyl ester of an acid prepared by the condensation of isoprene with maleic anhydride, n-butyl ester of 4 methyl tetra hydro phthalic acid. Sample 3 is a .2% blend of the isopropyl ester of an acid prepared by condensation of cyclo-pentadiene with maleic anhydride. These three samples were submitted to the Mougey test described in National Petroleum News, Nov. 11, 1933, page 47, article by Mougey and Almen, using an aluminum to steel bearing:

| Samples | Weights carried | Final friction |
| --- | --- | --- |
|  |  | In. lbs. |
| No. 1 | 16 |  |
| No. 2 | 24 | 50 |
| No. 3 | 25 | 55 |

2. The ester used in this test is prepared by condensing a vapor phase cracked gasoline with maleic acid and esterifying the mixture of acids thus produced with isopropyl alcohol. These acids are, of course, dibasic. The mixed esters show an acid number of 12.3 mg. KOH per gram and a saponification number of 194.8.

These mixed esters are added to an oil in 2% concentration and submitted to the Mougey test as in Example 1.

| Samples | Weight carried | Friction |
| --- | --- | --- |
| Oil (unblended) | 18 | Sheared pin |
| Oil and ester | 25 | 33 |

The oils were tested for corrosion on various alloy bearings, copper-lead, cadmium-silver (Pontiac) cadmium-silver (Ford), cadmium nickel. In each case the corrosion removed as milligrams loss was considerably less in the case of the ester blended oil than with the straight mineral oil.

As another example may be cited a condensation product of maleic anhydride with a turpentine fraction such as cyclic diolefins. This material was esterified with butyl alcohol. When 2% of the ester is added to a mineral oil it is found that the blend carries the full 25 weights on the Mougey test with a final friction value of 16½ inch pounds.

The present materials are to be used principally in motor oils but it will be understood that they may be added to other types of lubricants both liquid and solid, an example of which is furnished by the greases. These materials may be used also in industrial oils, cutting oils, and the like. It is found that their action is not in any way hindered by the presence of other known compounding agents such as soaps, oxidation inhibitors, dyes, thickeners, load bearing agents, pour inhibitors and the like.

The present invention is not to be limited by any theory of the mechanism of the reactions leading to the formation of the acids, nor to the specific diolefins used, or the specific esters, but only to the following claims in which it is desired to claim all novelty in the invention.

We claim:

1. An improved lubricant comprising a viscous hydrocarbon and a small quantity of an acid compound produced from the condensation product of diolefins contained in cracked naphtha with a material selected from the class consisting of maleic anhydride and unsaturated aldehydes.

2. An improved lubricant comprising a viscous hydrocarbon and a small quantity of an alkyl ester of an acid obtained from the condensation product produced from the diolefins contained in vapor phase cracked naphtha with a compound selected from the class consisting of maleic anhydride and unsaturated aldehydes.

3. An improved lubricant comprising a viscous hydrocarbon and a small quantity of an acid compound derived from the product obtained by the condensation of a conjugated diolefin, containing more than four carbon atoms, with an organic material selected from the group consisting of maleic anhydride and unsaturated aldehydes.

4. An improved lubricant comprising a viscous hydrocarbon and a small quantity of an ester derived from the product obtained by the condensation of a conjugated diolefin, containing more than four carbon atoms, with an organic material selected from the group consisting of maleic anhydride and unsaturated aldehydes.

5. An improved lubricant according to claim 4 in which the ester is an alkyl ester.

6. An improved lubricant according to claim 7 in which the diolefin contains not less than 5 nor more than 8 carbon atoms in the ring.

7. An improved lubricant comprising a viscous hydrocarbon, and a small quantity of an acid compound derived from the product obtained by the condensation of a cyclic conjugated di-olefin with maleic anhydride.

LOUIS A. MIKESKA.
RAPHAEL ROSEN.